United States Patent [19]

Lin

[11] Patent Number: 5,628,885

[45] Date of Patent: May 13, 1997

[54] EXTRACTION INSTALLATION FOR HYDROGEN AND OXYGEN

[76] Inventor: Yang C. Lin, No. 3, Lane 13, Alley 473, Nanta Road, Hsinchu, Taiwan

[21] Appl. No.: 555,020

[22] Filed: Nov. 13, 1995

[51] Int. Cl.$^6$ .............................. C25B 9/00; C25B 15/08
[52] U.S. Cl. .................... 204/228; 204/237; 204/239; 204/241; 204/270; 204/278; 204/268
[58] Field of Search .................................. 204/240, 268, 204/269, 270, 228, 237, 274, 278

[56] References Cited

U.S. PATENT DOCUMENTS

| | | | |
|---|---|---|---|
| 3,957,618 | 5/1976 | Spirig | 204/270 |
| 4,014,777 | 3/1977 | Brown | 204/270 |
| 4,424,105 | 1/1984 | Hanson | 204/270 X |
| 4,457,816 | 7/1984 | Galluzzo et al. | 204/270 X |
| 5,292,405 | 3/1994 | Wicks | 204/268 X |

*Primary Examiner*—Donald R. Valentine
*Attorney, Agent, or Firm*—Beveridge, DeGrandi, Weilacher & Young, L.L.P.

[57] ABSTRACT

This electrolytic apparatus for a welding machine uses an electrolytic cell, a mixing tank and a multi-control switch. The electrolytic cell is composed of several pieces of electrode plates which are assembled in a row, the farthest side of which is connected to the positive and negative poles of electrolysis power. After electrolysis, the gas proceeds in a storage tank and the liquid is guided back into the electrolytic cell for recycling use. The fuel gas then goes into a first chamber to get rid of water. In the meantime, part of the fuel gas will be combined with carbohydrate dissolvent to alter its fuel composition and then be recombined with the rest of the gas to provide a desired fuel. This way, the heat of the gas can be heightened, flame temperature can be lowered, and the output ratio for the fuel gas can be controlled and adjusted to attain a welding gun's flame within a comprehensive scope of temperature and heat. Furthermore, this invention uses the pressure from a multi-control switch monitoring the process to keep it in a tolerable range to provide safety protection.

21 Claims, 10 Drawing Sheets

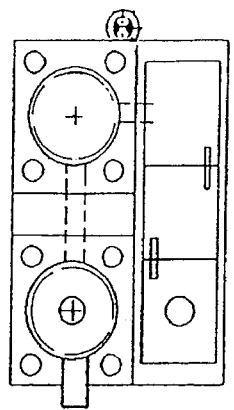
FIG 5D
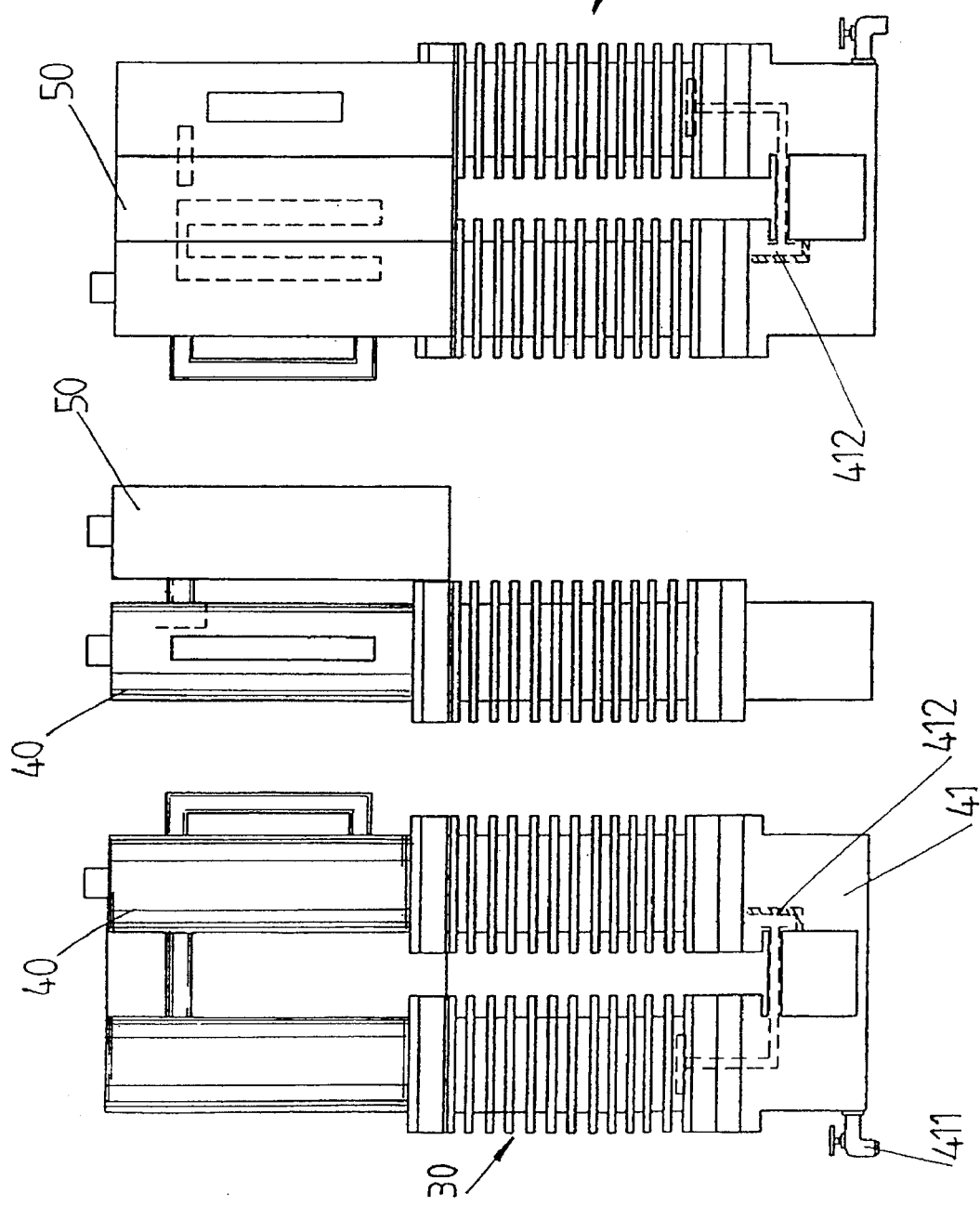
FIG 5C
FIG 5B
FIG 5A

EXTRACTION INSTALLATION FOR HYDROGEN AND OXYGEN

FIELD OF THE INVENTION

This invention relates to a sort of extraction installation for hydrogen and oxygen which can be applied to oxy-hydrogen welding machine. Especially it specifies its function of using a multi-pole partial pressure composition to equally share electrolysis voltage so as to the current needed can be attained. As well, use of a mixing tank to mix fuel composition, the welding flame temperature of the welding machine can be adjusted.

BACKGROUND OF THE INVENTION

The industrial used oxy-hydrogen welding machine is to take advantage of mixed gas, which is generated from electrolysis in the electrolytic cell, leading it into a welding gun to reach the function of welding. The theoretic value for the flame temperature of welding gun is at 3640° C. Yet the usage of oxy-hydrate welding gun is not applicable everywhere due to its high flame temperature and low heat. Usually the heat can be heightened and flame temperature can be lowered through altering the fuel molecule composition of a dissolvent made from carbohydrate mixed with hydrogen and oxygen. Nevertheless, only by constantly replacing different oxy-hydrogen dissolvent can this habitual-use installation alternate its flame temperature. Whenever dissolvent being changed, flame with specific temperature can be gained. However, the temperature of the flame is invariable during usage. This makes the installation lack application flexibility and needs replacement of dissolvent all the time or even replacement of the mixing tank, which is relatively inconvenient.

Furthermore, The industrial-used electrolytic cell is generally classified into high voltage and low voltage. The one being used by oxy-hydrogen welding machine belongs to low voltage electrolytic cell. The low voltage industrial-used extraction electrolytic cell for hydrogen and oxygen which most people know about is to use single-pole electrode plate. It is necessary for the high voltage to be lowered through transformer, then commutated and eventually input into electrolytic cell as electrolysis power. Since magnetic loss is one of transformer's trait which results in low power application effectiveness. Moreover, big dimension and heavy weight of transformer also makes the whole machine become hefty and unmovable, which is not good for the interest use. Especially most of this sort of equipments are used as processing machine which lays keen emphasis on its handiness and portability, so lowering down its dimension, weight and enhancing its effectiveness become important goals of research and development. Furthermore, the process through transformer to lower voltage then commute into electrolytic cell, the commutator must be a material with high tolerance of current which causes high heat loss, low effectiveness and prone to burning out. Eventually, in order to generate a large volume of oxygen, it becomes necessary to use a huge electrolysis area of electrode plate to obtain big current electrolysis, so the dimension and weight are needed to be enlarged. All these reasons lead to the heaviness and hugeness on equipment which is of low effectiveness, not good for the operator.

SUMMARY OF THE INVENTION

The primary purpose of this invention is to provide an extraction installation for hydrogen and oxygen which can be applied to the oxy-hydrogen welding machine. It is mainly composed of electrolytic cell without cover, a mixing tank for mixture of fuel composition in process and a set of multi-control switch with self-protection function. The electrolytic cell is assembled by several pieces of electrode plates in a parallel row. Through electrode plates connected in series to equally share the voltage from electrolysis power, it is unnecessary to lower the voltage through transformer and the current of commutator can be lowered so as to the dimension and weight on the cover of the electrolytic cell can be minimized and effectiveness can be heightened. Through the storage tank connected to the top of electrolytic cell, the dispersed electrolysis liquid can be collected and re-input into the electrolytic cell for recycling use and the temperature of the electrolytic cell can be controlled via temperature controlling method within a specific range. Through water erasing chamber inside of the mixing tank, to get rid of water vapor inside of the oxygen gases and hydrogen and through mixing chamber to mix oxygen and hydrogen with a carbohydrate dissolvent, the discharge ratio of output gas by these water erasing and mixing chambers can be controlled to get a welding flame with a comprehensive temperature range. The carbohydrate dissolvent can be refilled through mixing tank. If a drawing case occurs, the dissolvent trait as liquid itself can be used to cut off the flame route and a guiding tube can be used to connect the carbohydrate dissolvent inside of mixing tank into returning chamber so that the abrupt voltage triggered by the drawing can be alleviated. Through the installation with voltage switch protection, whenever the fuel gas is insufficient, the gas valve is automatically off and the outlets providing gas would be cut off, so the phenomenon of drawing can be avoided. Through the fire stone installed in the welding gun, whenever a drawing case occurs, the flame can be instantly put out by the fire stone to avoid a flame from continuous burning. Through the voltage inside of storage tank monitored by a multi-control switch, if there is any out-of-order occurred in the installation as to the voltage rising up beyond the limit, the power would be cut off to protect the safety.

BRIEF DESCRIPTION OF THE DRAWINGS

FIGS. 5(a)–5(d) are the assembly diagrams for this invention.

DETAILED DESCRIPTION OF THE INVENTION

Figure 1:
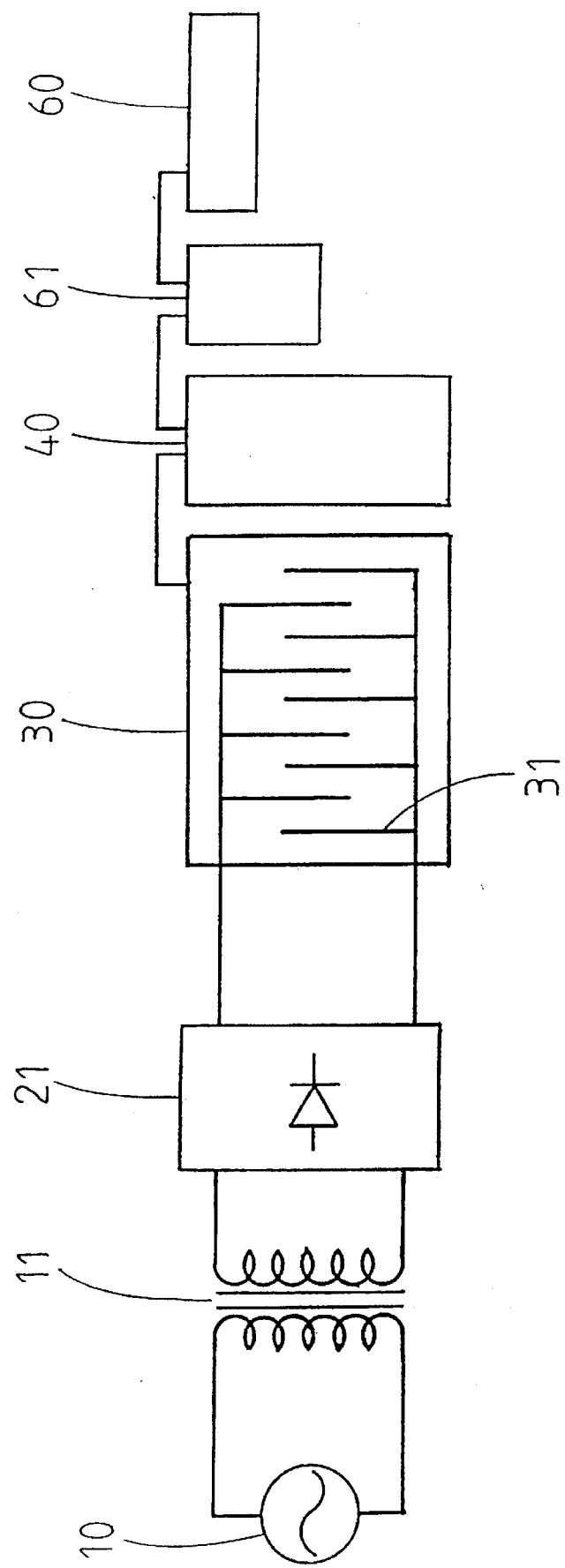
FIG. 1 is the routing diagram for a prior art oxy-hydrogen welding machine.
Figure 2:
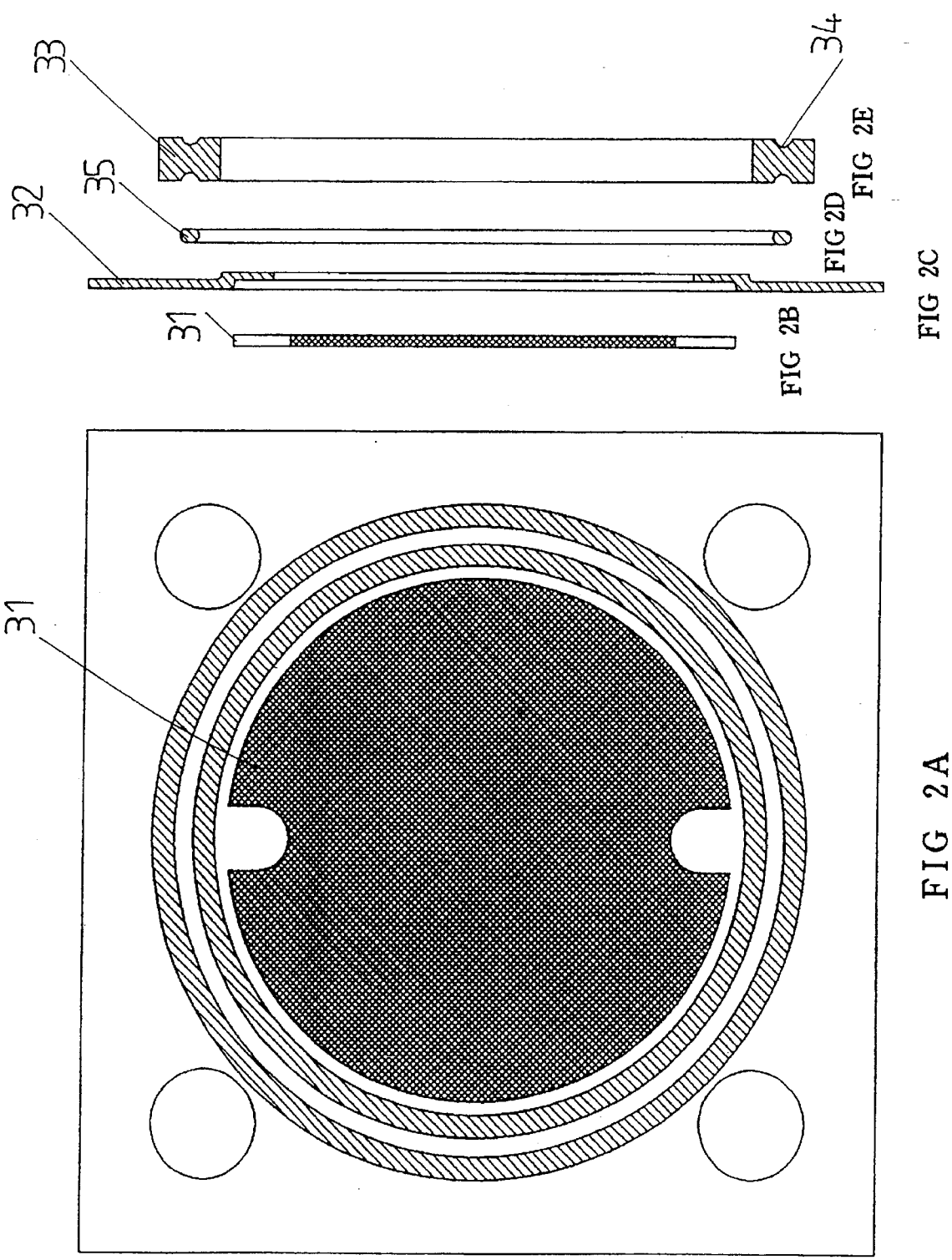
FIGS. 2(a)–2(e) are the decomposition diagrams for electrolytic cell of this invention.
Figure 3:
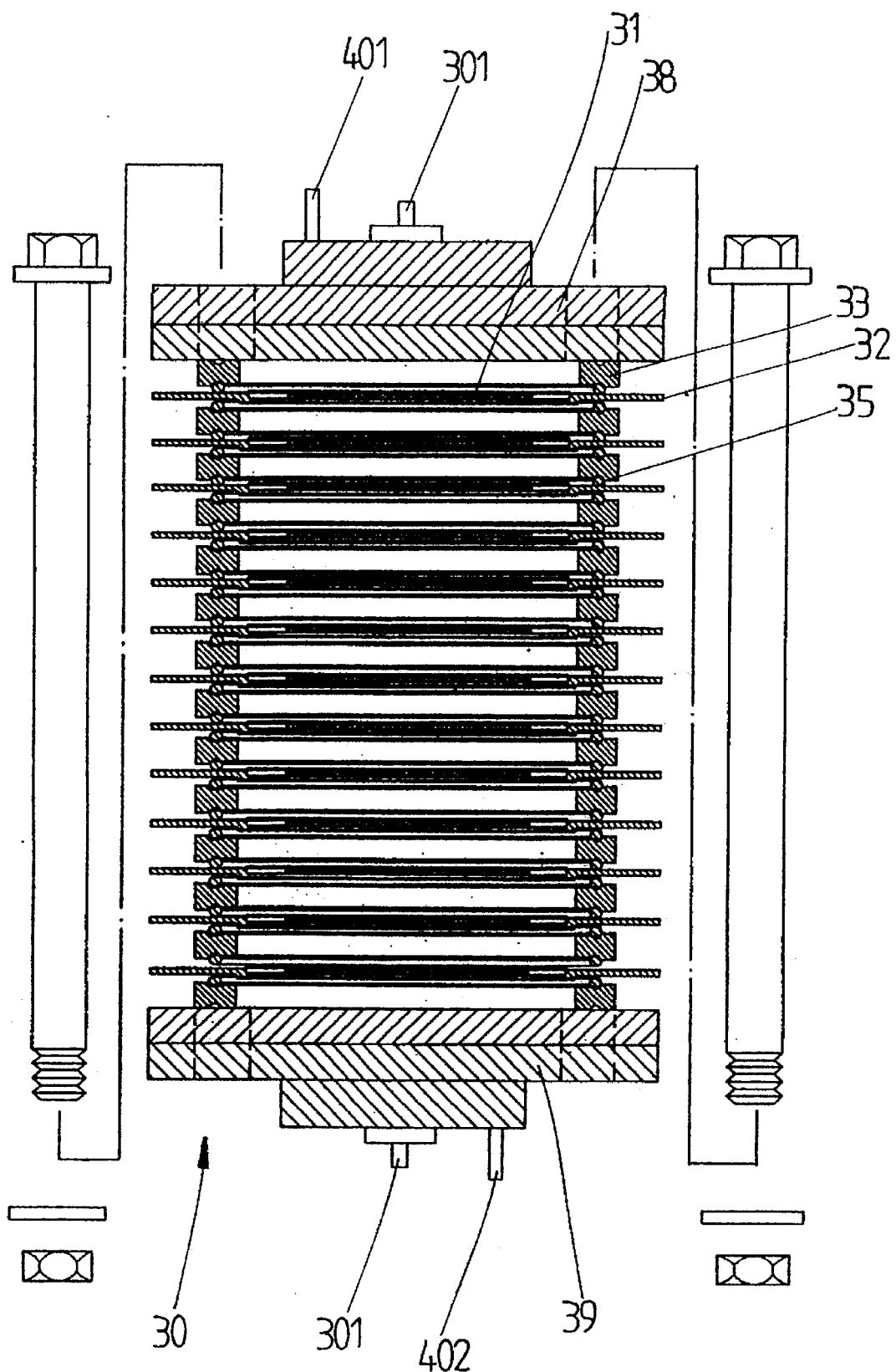
FIG. 3 is the dissection diagram for the electrolytic cell of this invention.
Figure 4:
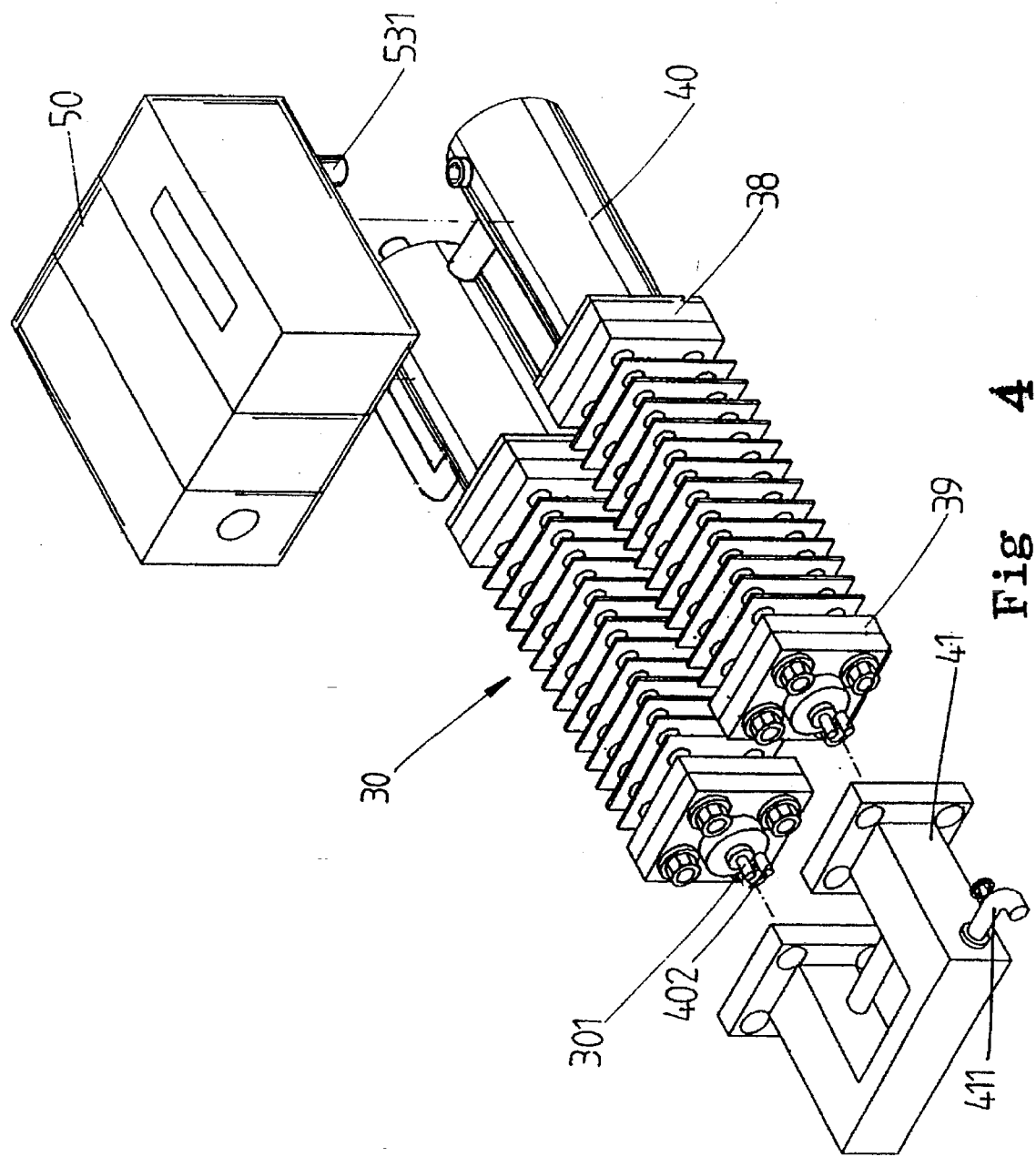
FIG. 4 is the composition indicating diagram for this invention.

FIG. 1 is the routing diagram for a prior art oxy-hydrogen flame welding machine. It is to use ordinary alternating current 10 and to be depressed through transformer 11, using commutator 21 to commutate it into direct current as the electrolysis power for electrolytic cell 30's use. Inside of electrolytic cell 30, there is an electrode plate 31 to resolve water into hydrogen and oxygen, conveying it into storage 40 for storage and to control its discharge via gas valve 61 for welding gun 60's use. As the electrolysis electric pressure is about 1.5 to 3 voltage and the alternating current 10 is of high electric pressure at more than 110 voltage while using single-polar electrolysis, it is necessary to use transformer 11 to lower down the electric pressure. Yet the transformer 11 only holds 50% of its effectiveness and turns to be very heavy due to magnetic loss and heat loss for big current; nevertheless, it is necessary to use big current to generate large volume of electrolysis gas. For all these reasons, the commutator 21 needs to be big and the area of electrode plate 31 also needs to be enlarged, which make the whole machine heavy and unmovable.

Furthermore, the conventional way is to use single storage tank 40 for collecting gas, which makes the electrolysis liquid prone to overflowing into storage 40 and spilling out of welding gun 60 through gas valve 61 to result in the biggest drawback for the uncontrollable flame temperature of welding gun. Taking the mixed gas of oxygen and hydrogen as fuel, which contains low heat with high flame temperature at 3640° C., it is possible to lower the flame temperature and heighten heat content to alternate fuel composition through putting carbohydrate dissolvent into storage tank 40. Nevertheless, different carbohydrate dissolvents will generate different flame temperature and heat content. In general, the storage tank 40 with different carbohydrate dissolvent needs to be replaced. However, the flame temperature turns to be invariable once being installed, which is pretty inconvenient.

Figure 6:
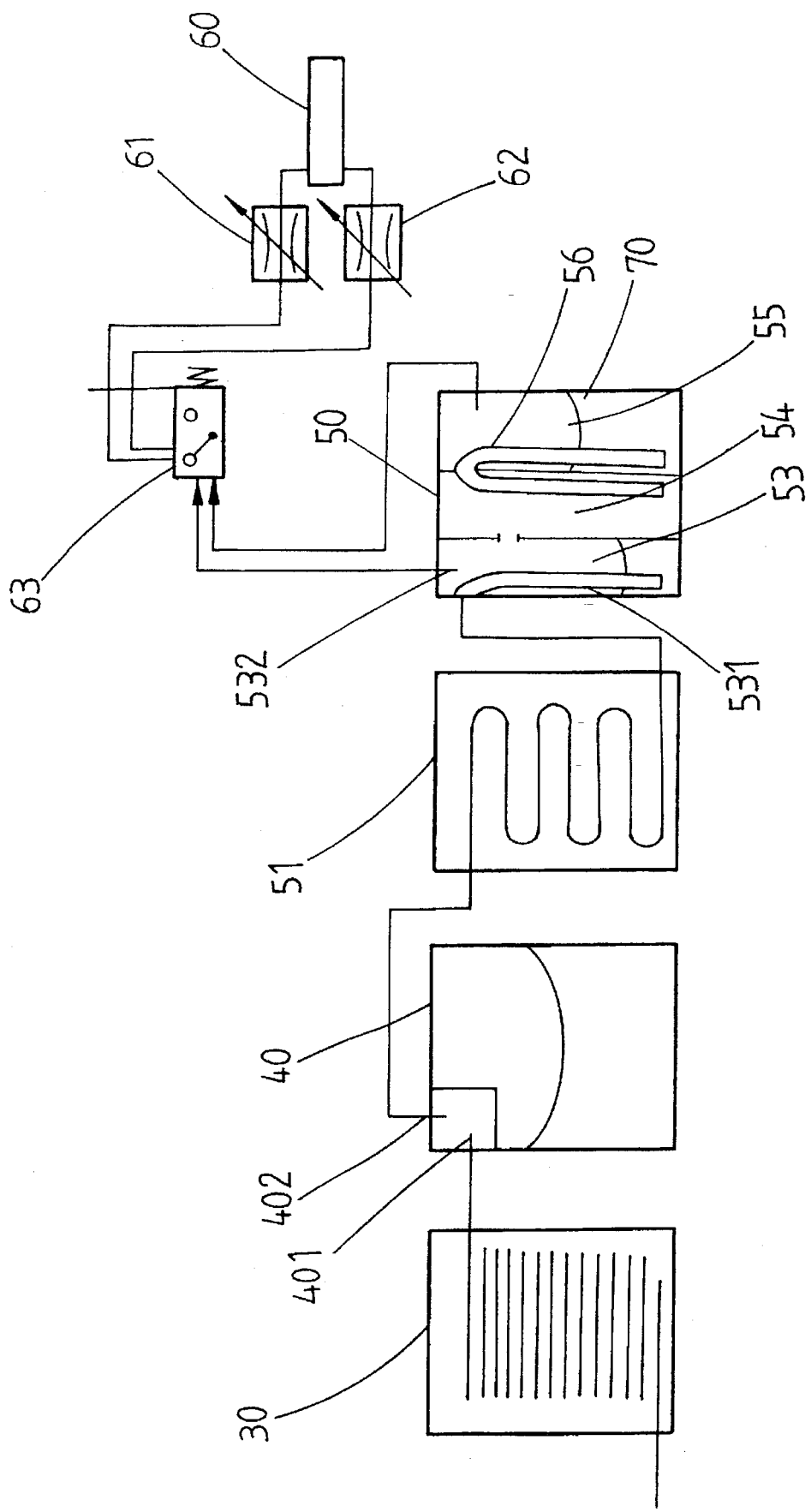
FIG. 6 is the routing diagram for this invention.
Figure 7:
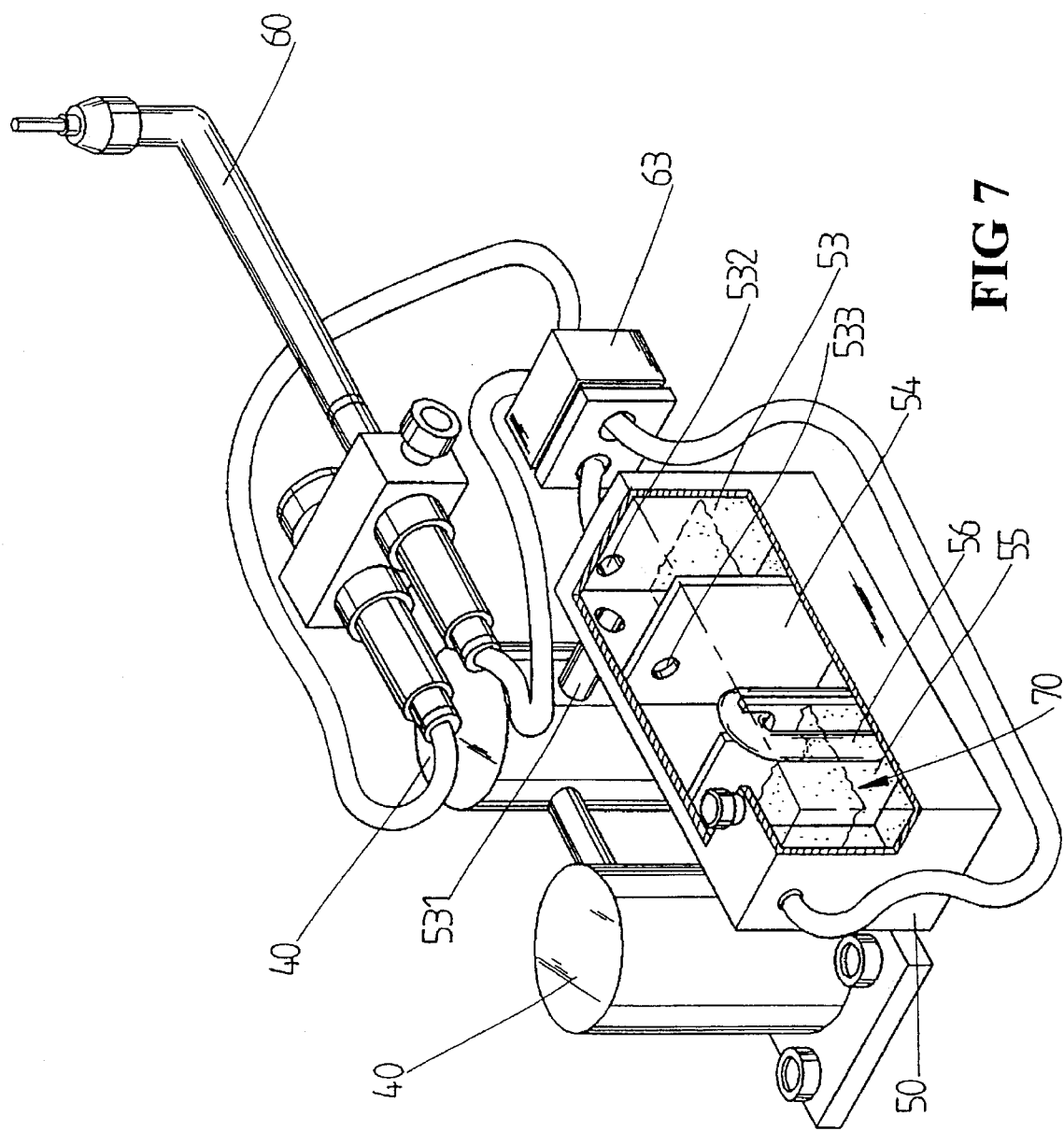
FIG. 7 is partial composition indicating diagram for this invention.

This invention provides a way, by using a storage tank matching mixing tank, to improve the drawback of the prior art. Referring now to FIGS. 2(a)–(e) and 3, the storage tank 40 is shown connected on top of electrolytic cell 30. The electrolytic cell 30 is composed of several pieces of electrode plates 31 which are lined in a parallel row. Each electrode plate 31 is stuck to a heat dispersing board 32, the gap between two dispersing board 32 is divided by a insulate pad 33. In which there is a concave trough 34 installed in the front and back side of the insulate pad 33. There is an insulate oil seal 35 inset into concave trough 34 to avoid contacting as to cause short circuit. Lining up aforementioned assemblies and connecting the farthest layer with upper cover 38 and lower cover 39, connecting electrode joint 301 individually with electrode plate 31 in the most outer layer, a multi-polar composition with connection in series and a electrolytic cell 30 without cover are formed. With reference now to FIGS. 4 and 5(a)–(d) also, the storage tank 40 is shown closely fixed on top of electrolytic cell 30 and circulated with upper cover 38 through gas intake 401 so that the electrolysis liquid can be complemented directly through storage tank 40 with no need of opening electrolytic cell 30. After getting through electrolytic cell 30, the electrolytic liquid should be directed into filtering tank 41 for filter through exhaust outlet 402. The filtering tank 41 is connected with lower cover 39 and somewhere appropriate on top of which there is a row of rejecting outlets 411 and a filtering net 412 installed. The residue filtered out from the electrolysis liquid will be rejected through rejecting outlet 411. The liquid after electrolysis will be guided back to electrolytic cell 30 for recycling use. The oxygen and hydrogen will be directed into mixing tank 50 through gas inhaling tube 531 for use (as shown on FIG. 4 & 5). The routing figure is as shown in FIG. 6, electrolytic liquid directly gets into storage tank 40 through electrolytic cell 30 and in which the gas and liquid are segregated. In which oxygen and hydrogen again gets into mixing tank 50 through condenser 51. In contrast with partial composition indicating diagram on diagram 7, the mixing tank 50 is divided into 3 chambers; they are water erasing chamber 53 for removing moisture from the mixed gases, returning chamber 54 and mixing chamber 55. In order to clearly manifest the characteristics of mixing tank 50, the gas inhaling tube 531 and guiding tube 56 are displayed in enlarged size (there is no indication of gas valve 61 & 62 in FIG. 7). Oxygen and hydrogen is directed into water erasing chamber 53 through gas inhaling tube 531 to get rid of vapor contained in the mixed gas, then oxygen and hydrogen is output as fuel through exhaust outlet 532. Since it is pure mixed gas with oxygen and hydrogen, the combustion point is high and heat content is low with highest flame temperature around 3640° C.; there is a gas sharing outlet 533 installed in water erasing chamber 53 to extract part of gases getting into returning chamber 54. There is a guiding tube 56 installed between returning chamber 54 and mixing chamber 55, one end of which is dropping downward to the bottom of returning chamber 54 and the other end of which is buried into carbohydrate dissolvent 70 inside of mixing chamber 55. Oxygen and hydrogen gets into mixing chamber 55 through guiding tube 56 and combined with carbohydrate dissolvent 70 and alters the molecule composition or structure to get different fuel traits. There are carbohydrate dissolvents 70 that can be used like acetone, alcohols or volatile oils, which are with different combustive temperature and heat. There are two sorts of fuels being guided into welding gun 60; one is drawn out from water erasing chamber 53 directly to welding gun 60 through the 1st gas valve 61, which is a mixed gas with oxygen and hydrogen in a high combustive temperature and low heat. The other is drawn out from mixing chamber 55 to welding gun 60 through 2nd gas valve 62, which is a gas combined with carbohydrate dissolvent in a low flame temperature and high heat. To control the discharge ratio through gas valve 61 & 62, the flame temperature can be adjusted within the range of 800° to 3640° C.

In order to provide protective function, there is a pressure switch 63 installed to monitor the gas pressure inside of water erasing chamber 53 and control gas valve 61 & 62. When there is insufficient pressure in the water erasing chamber 53, pressure switch 63 will immediately close gas valve 61 & 62 to avoid drawing phenomenon. The mixing tank 50 itself also has protective function, eg: if there is a drawing occurred, the oxygen and fuel is scarce inside of mixing chamber 55 which would be burned out in a minute—this is so called liquid extinguishment. The inner pressure generated within a minute would thrust dissolvent 70 into guiding tube 56 to hinder the fuel gas from continuously entering in the meantime to alleviate the pressure as to avoid mechanical damage and reach the goal of extinguishment and safety protection.

Figure 8:
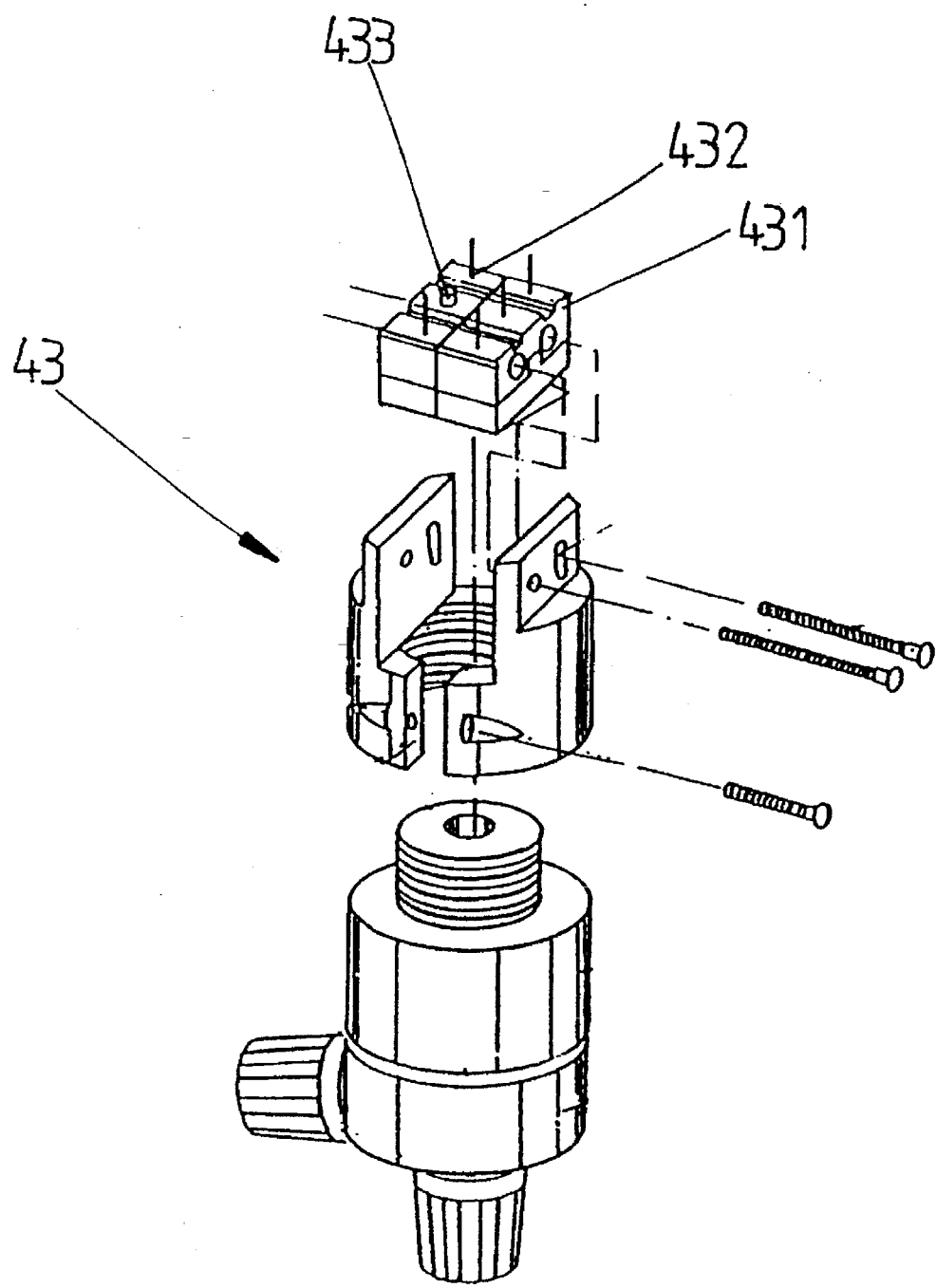
FIG. 8 is multi-control switch indicating diagram for this invention.

Please refer to FIG. 8, which is the indication figure for the multi-control switch of this invention. The pressure inside of storage tank 40 is rather high, which could cause danger easily. In order to provide safety measures, there is a multi-control switch 43 installed to monitor the pressure inside of storage tank 40. It is composed of a micro-active switch 431 and a limitation switch 432, which are individually connected with pressure power and pressure meter via a 3-plug tube to know the amount of air pressure. When air pressure is within the range of a preset limit, only the micro-active switch 431 is needed for switch alternating action; yet when air pressure exceeds the preset limit, the limitation switch 432 would start acting and cut off the power for whole installation. The reset button 433 on top of limitation switch 432 can be pressed to place the whole operation back to normal until all the warning is released.

Figure 9:
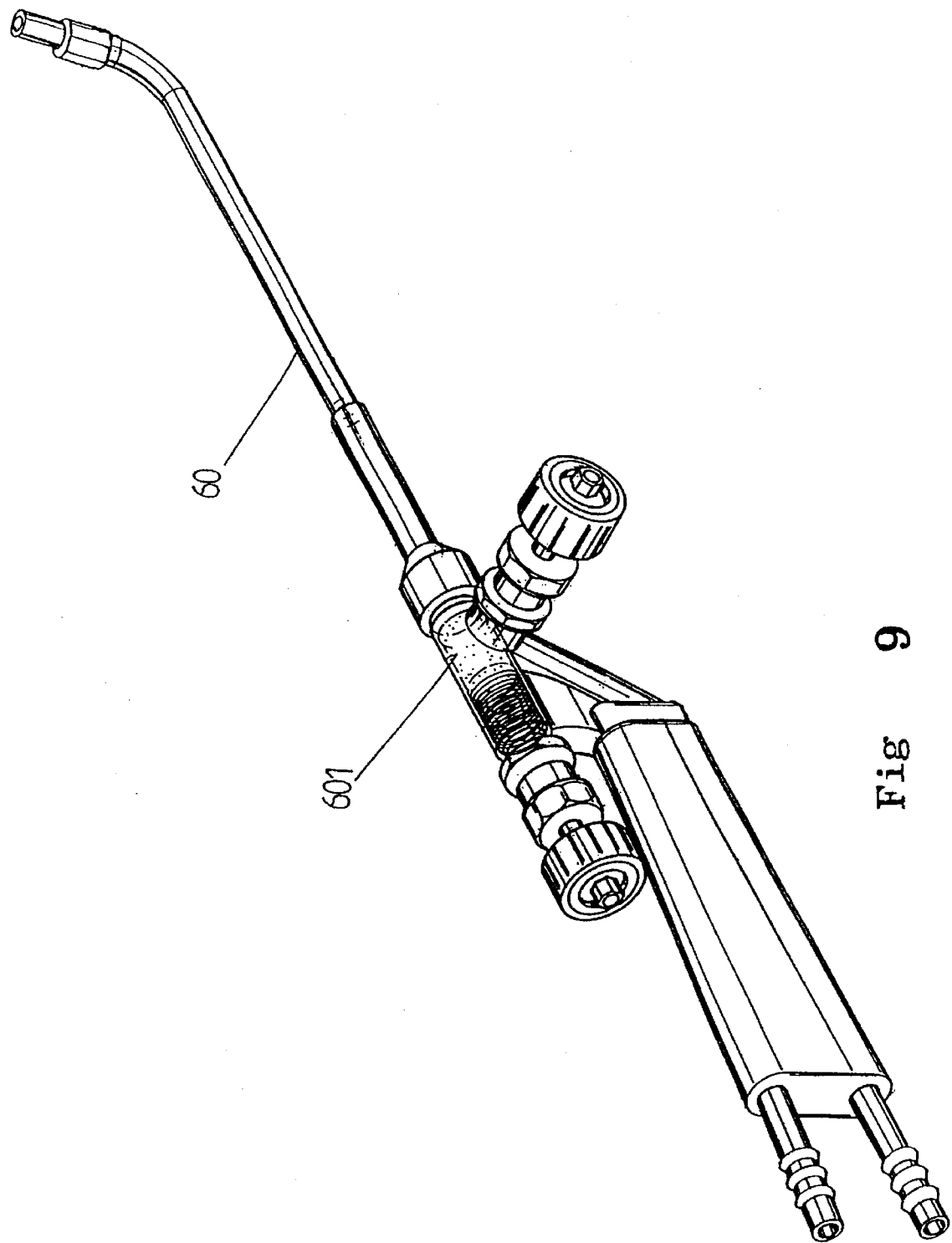
FIG. 9 is the composition of fire-stone installed in the welding gun of this invention.

As shown in FIG. 9, there is a fire-stone installed inside of welding gun 60 of this invention to further provide protection. The fire-stone 601 is installed inside of the output passage after the mixture of two fuels. If a drawing case occurs, the flame would be put out by the fire-stone.

Figure 10:
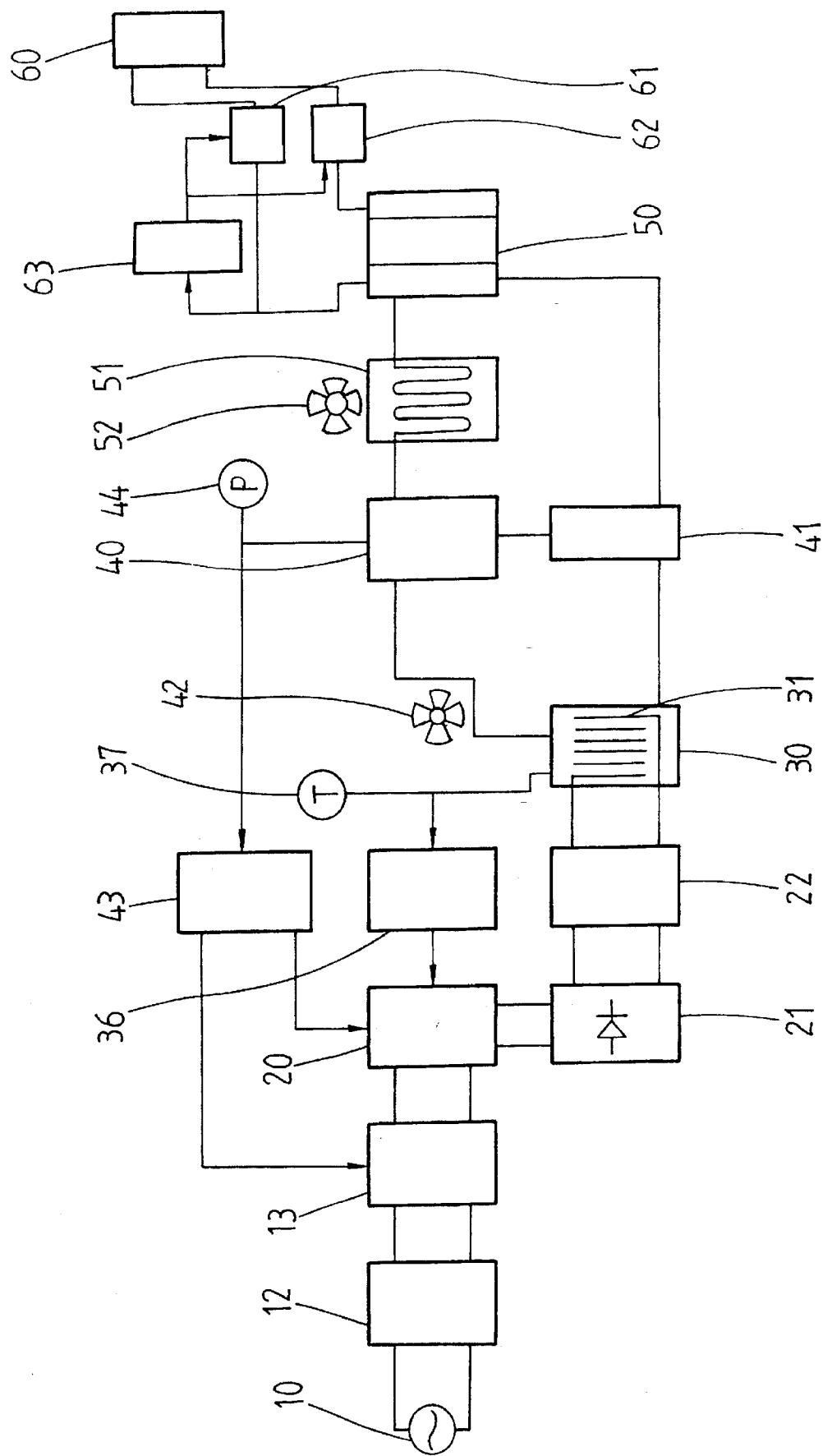
FIG. 10 is the routing diagram of the oxy-hydrogen flame welding machine for the implementation of this invention.

FIG. 10 is the routing figure of oxy-hydrogen flame welding gun for the implementation of this invention. Of which electric power 10 being used is of ordinary voltage, can be 110, 220, 380 or 440 voltage and so forth which passes through a no-fuse switch 12 and a magnetic switch 13. Magnetic 13 is for the purpose of protection, when an out-of-order occurs, it would be controlled for cutting off power and stopping continuous action. Magnetic switch 13 is connected to control circuit 20. The voltage can be adjusted and input into commutator 21 to commutate it into direct current. Control circuit 20 provides the electric power for other equipment assemblies and controls the go-or-stop of electrolysis action. The electric pressure after commutating through commutator 21 is still high voltage would be the direct current for electrolysis use. The direct current is input into electrolytic cell 30 through a polarity alternating switch 22 which could alternate the input power polarity, so the positive and negative pole inside of electrolytic cell 30 can be alternated and the specific electrode plate would not be encircled with electrolysis mud to help extend the expiration of the electrolytic cell. The oxygen and hydrogen and overflowed electrolytic liquid or vapor would be sent to storage tank 40 in which the returning liquid returning back to electrolytic tank 30 through filtering tank 41 for recycling use. It is possible to install a fan 42 between filtering tank 41 and electrolytic cell 30 to keep electrolytic cell 30 to work under appropriate temperature and to use temperature-control switch to get more protection. When the temperature of electrolytic cell 30 exceeds set value, the gas valve 61 & 62 would be closed to stop providing gas. The fuel gas will continue to be provided until the electrolytic liquid flowing and circulating and lowering to the appropriate value. If the temperature of electrolytic cell 30 keeps going up to the limit value, the power of commutator 21 sent by control circuit 20 should be cut off to hinder the electrolysis from continuing process. Temperature meter 37 is for the use of observing temperature of electrolytic cell 30; the oxygen and hydrogen after segregation inside of storage tank 40 needs to be further dried through condenser 51 so as to be taken as fuel being input into mixing tank 50 for use. In order not to cause danger by the too high voltage inside of storage cell 40, there is a pressure meter 44 for observation and a multi-control switch 43 for monitoring of the pressure inside of storage tank 40. Through control circuit 20 to control electrolytic power, the pressure can be kept within a tolerable range. If there is out-of-order occurred in the installation which keeps the pressure going up as to exceed the limit, the magnetic switch 13 would directly cut off the power to reach the function of safety protection.

What is claimed is:

1. An electrolytic apparatus, comprising:
   an electrolytic cell for producing a first gas from an electrolytic solution;
   a storage tank in fluid communication with said electrolytic cell for storing said first gas;
   a water erasing chamber in fluid communication with said storage tank for removing moisture from said first gas received from said storage tank;
   a returning chamber in fluid communication with said water erasing chamber for receiving a portion of said first gas in said water erasing chamber;
   a mixing chamber in fluid communication with said returning chamber for receiving said portion of said first gas in said returning chamber, said mixing chamber having a gas altering medium disposed therein for contacting and transforming said portion of said first gas into a second gas;
   a first exhaust outlet located on said water erasing chamber for an amount of said first gas to exit therethrough;
   a second exhaust outlet located on said mixing chamber for an amount of said second gas to exit therethrough;
   wherein, a fuel is formed from said amount of said first gas and said amount of said second gas.

2. An electrolytic apparatus as defined in claim 1, further comprising:
   varying means for varying said amount of said first gas and said amount of said second gas such that said fuel is formed with desired combustion characteristics.

3. An electrolytic apparatus as defined in claim 2, further comprising:
   a welding gun for receiving said first amount of said first gas and said second amount of said second gas from said varying means during welding.

4. An electrolytic apparatus as defined in claim 2, wherein:
   said varying means comprises a first gas valve in fluid communication with said first exhaust outlet and a second gas valve in fluid communication with said second exhaust outlet,
   wherein, said amount of said first gas is determined by said first gas valve and said second amount of said second gas is determined by said second gas valve.

5. An electrolytic apparatus as defined in claim 4, further comprising:
   a welding gun in fluid communication with said first gas valve and said second gas valve for receiving said fuel during welding.

6. An electrolytic apparatus as defined in claim 5, wherein:
   said gas altering medium comprises carbohydrate dissolvents.

7. An electrolytic apparatus as defined in claim 6, wherein:
   said water erasing chamber, said returning chamber and said mixing chamber comprise a mixing tank.

8. An electrolytic apparatus as defined in claim 7, further comprising:
   a gas sharing outlet positioned between said water erasing chamber and said returning chamber for providing fluid communication therebetween; and
   a guiding tube positioned between said returning chamber and said mixing chamber for providing fluid communication therebetween.

9. An electrolytic apparatus as defined in claim 8, further comprising:
   a gas inhaling tube positioned between said storage tank and said water erasing chamber for providing fluid communication therebetween.

10. An electrolytic apparatus as defined in claim 9, wherein:
    said gas sharing outlet is positioned at a top portion of said water erasing chamber and at a top portion of said returning chamber, said guiding tube has a first end and a second end, said first end of said guiding tube entering a top portion of said returning chamber and extending to a bottom portion of said returning chamber, said second end of said guiding tube entering a top portion of said mixing chamber and extending to a bottom portion of said mixing chamber, and said gas inhaling tube entering said water erasing chamber at a top portion and extending to a bottom portion thereof.

11. An electrolytic apparatus as defined in claim 10, wherein:

said electrolytic cell includes a plurality of electrode plates, a plurality of heat dispersing boards supporting said electrode plates, at least one insulate pad having a trough defined on opposite faces, and an insulate oil seal disposed in each trough of said insulate pad, said heat dispersing boards being in alternating alignment with said insulate pad.

12. An electrolytic apparatus as defined in claim 11, wherein:

said insulate pad further includes an inner periphery, said electrode plates and said electrolytic solution being contained within said inner periphery of said insulate ring during electrolysis.

13. An electrolytic apparatus as defined in claim 12, wherein, said electrolytic cell includes a plurality of electrode plates, a plurality of heat dispersing boards supporting said electrode plates, at least one insulate pad having a trough defined on opposite faces, and an insulate oil seal disposed in each trough of said insulate pad, said heat dispersing boards being in alternating alignment with said insulate pad.

14. An electrolytic apparatus as defined in claim 1, wherein:

said electrolytic cell includes a plurality of electrode plates, a plurality of heat dispersing boards supporting said electrode plates, at least one insulate pad having a trough defined on opposite faces, and an insulate oil seal disposed in each trough of said insulate pad, said heat dispersing boards being in alternating alignment with said insulate pad and said insulate pad including an inner periphery, said electrode plates and said electrolytic solution being contained within said inner periphery of said insulate ring during electrolysis.

15. An electrolytic apparatus as defined in claim 14, wherein:

said insulate pad further includes an inner periphery, said electrode plates and said electrolytic solution being contained within said inner periphery of said insulate ring during electrolysis.

16. An electrolytic apparatus as defined in claim 15, wherein:

said electrolytic cell further includes a polarity alternating switch electrically connected to said electrode plates.

17. An electrolytic apparatus as defined in claim 16, further comprising:

varying means for varying said amount of said first gas and said amount of said second gas such that said fuel is formed with desired combustion characteristics.

18. An electrolytic apparatus as defined in claim 17, further comprising:

a welding gun for receiving said first amount of said first gas and said second amount of said second gas from said varying means during welding.

19. An electrolytic apparatus, comprising:

an electrolytic cell for producing a first gas from an electrolytic solution;

a storage chamber in fluid communication with said electrolytic cell for receiving said first gas;

a mixing tank including a water erasing chamber and a mixing chamber, said water erasing chamber being in fluid communication with said storage chamber for receiving said first gas from said storage chamber and said mixing chamber being in fluid communication with said water erasing chamber for receiving a portion of said first gas in said water erasing chamber, said mixing chamber having a gas altering medium disposed therein for contacting and transforming said portion of said first gas into a second gas;

a first exhaust outlet located on said mixing tank for an amount of said first gas to exit therethrough;

a second exhaust outlet located on said mixing tank for an amount of said second gas to exit therethrough;

wherein, a fuel is formed from said first gas and said second gas.

20. An electrolytic apparatus as defined in claim 19, further comprising:

a valve assembly in fluid communication with said fuel and said valve assembly being adjustable such that said fuel characteristics is variable.

21. An electrolytic apparatus as defined in claim 19, further comprising:

a welding gun in fluid communication with said first exhaust outlet and said second exhaust outlet for receiving said fuel during welding.

* * * * *